United States Patent [19]

Pinson

[11] Patent Number: 5,050,435
[45] Date of Patent: Sep. 24, 1991

[54] POSITION DETECTION SYSTEM FOR A SUSPENDED PARTICLE ACCELEROMETER

[75] Inventor: George T. Pinson, Huntsville, Ala.

[73] Assignee: The Boeing Company, Seattle, Wash.

[21] Appl. No.: 381,385

[22] Filed: Jul. 18, 1989

[51] Int. Cl.5 .............................. G01P 15/13
[52] U.S. Cl. ............................... 73/517 B
[58] Field of Search .............. 73/517 B, 517 R; 250/231 R, 231.1

[56] References Cited

U.S. PATENT DOCUMENTS

| 3,206,987 | 9/1965 | Cunningham . | |
|---|---|---|---|
| 3,370,472 | 2/1968 | Cunningham | 73/517 R |
| 3,583,226 | 6/1971 | Codina | 73/517 B |
| 3,664,196 | 5/1972 | Codina | 73/517 B |
| 3,731,542 | 5/1973 | Forsberg . | |
| 3,805,398 | 4/1974 | Russell et al. . | |
| 3,953,823 | 4/1976 | Katakura . | |
| 3,965,753 | 6/1976 | Browning, Jr. . | |
| 3,967,135 | 6/1976 | Balban et al. | 250/231 R |
| 4,277,895 | 7/1981 | Wiklund . | |
| 4,344,235 | 8/1982 | Flanders | 73/517 B |
| 4,384,487 | 5/1983 | Browning | 73/517 B |
| 4,566,328 | 1/1986 | Bernard et al. . | |
| 4,583,404 | 4/1986 | Bernard et al. . | |
| 4,598,586 | 7/1986 | Danielson . | |
| 4,688,141 | 8/1987 | Bernard et al. . | |
| 4,711,125 | 12/1987 | Morrison . | |

Primary Examiner—John E. Chapman
Attorney, Agent, or Firm—Finnegan, Henderson, Farabow, Garrett & Dunner

[57] ABSTRACT

An accelerometer having a charged particle electrostatically suspended between opposed field plates in a null position when the sum of the forces on the acelerometer equals zero, the accelerometer comprising LEDs projecting light beams for defining opposed boundaries of the null position between the opposed plates, light detectors for detecting occlusion of the light beams by the particle when the particle moves from the null position into the paths of the light beams, and a particle control system responsive to the light detectors for varying the electrostatic field generated by the opposed plates to return the particle to the null position.

12 Claims, 3 Drawing Sheets

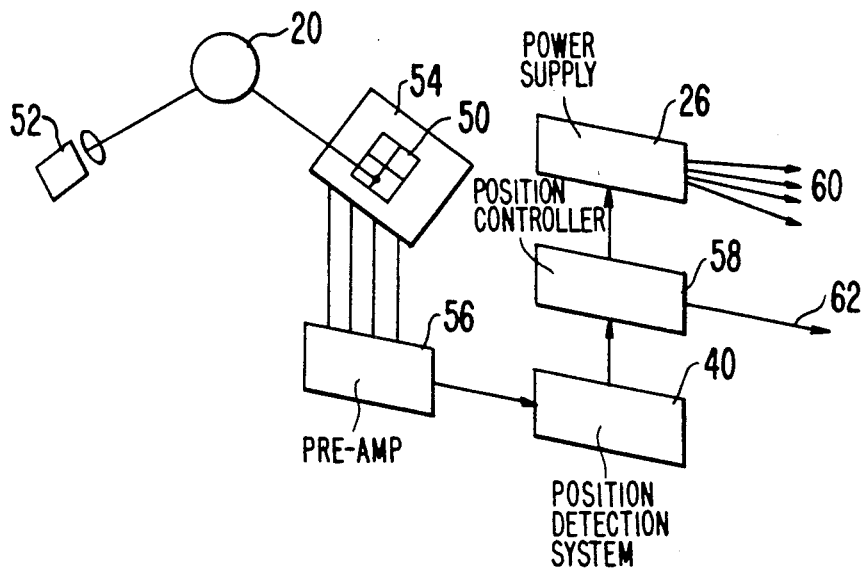
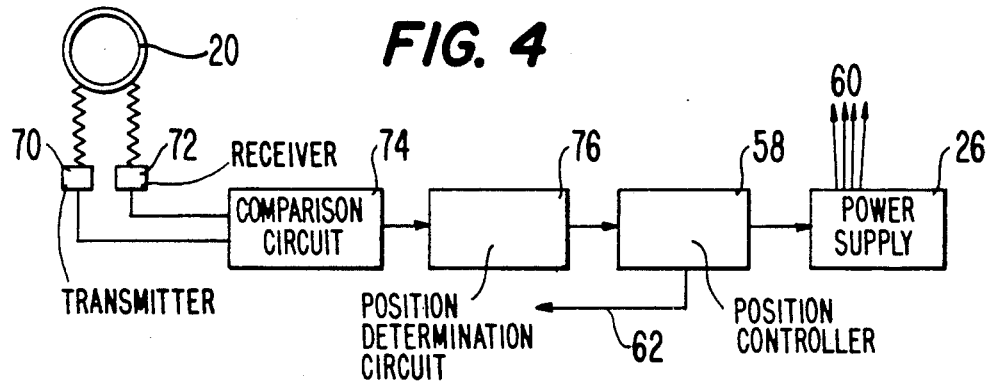
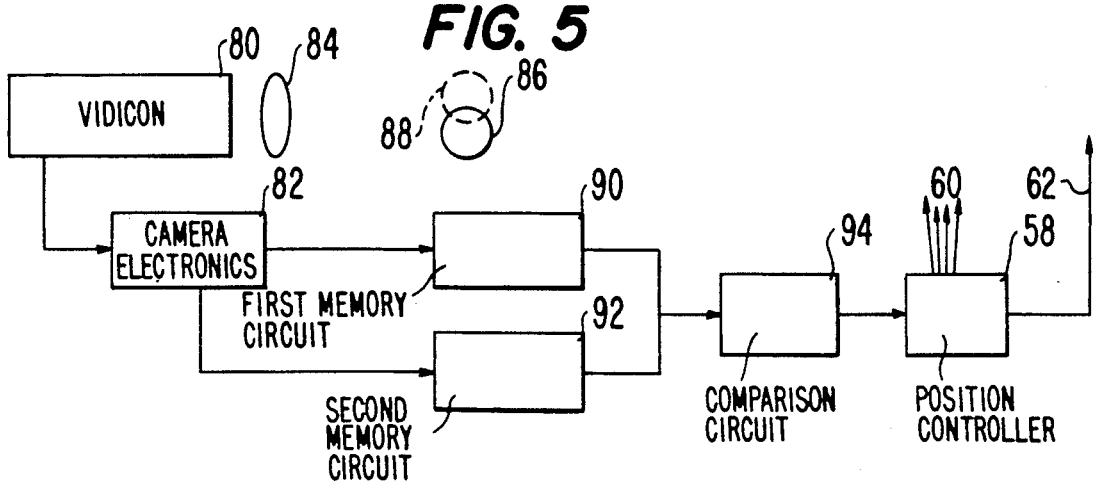

POSITION DETECTION SYSTEM FOR A SUSPENDED PARTICLE ACCELEROMETER

BACKGROUND OF THE INVENTION

1. Field of the Invention

This invention relates to suspended particle accelerometers that are primarly used in inertial navigation systems.

2. Background of the Invention

Accelerometers and rate sensors are key components in the control systems used in missiles, aircraft, ships, space vehicles, and other devices that must be maintained in a stabilized and controlled altitude and orientation relative to their surroundings. They are also used in navigation systems where the vehicle or device is required to accurately move from one point in space to some new desired point. The purpose of an accelerometer is to accurately determine forces acting on a body. This information can then be used as input to guidance and navigation systems either to counteract the applied forces or to predict the future state vector of the device.

There are a wide number of accelerometers available on the market. Many of these accelerometers employ principles of mass and spring action in an acceleration environment. In these types of accelerometers, a mass is moved from a null position whenever a force is detected parallel to the prime or active axis of the accelerometer. Some devices may use piezoelectric effects or changes in period of an oscillating element.

Other accelerometers employ a suspended particle. For example, the particle can be suspended by a properly shaped electrostatic field in a stable position whereby the forces acting on the particle are exactly balanced by the field. Accelerometers using this principle are disclosed in U.S. Pat. Nos. 3,370,472, 3,206,987, 3,664,196, 3,965,753, 4,384,487, 4,583,404, 4,566,328, and 4,688,141.

An inherent problem with prior art electrostatic accelerometers is their inability accurately to detect relative movement of the particle relative to the field plate.

The instant invention has overcome many of the disadvantages of the prior art devices by providing means for detecting movement of the charged particle from the null position.

Additional advantages of the invention are set forth in part in the description that follows, and, in part, will be obvious from the description or may be learned by practice of the invention. The objects and advantages of the invention may be realized by means of the instrumentalities and combinations particularly pointed out in the appended claims.

SUMMARY OF THE INVENTION

To achieve the foregoing objects, and in accordance with the purposes of the invention as embodied and broadly described herein, there is provided an accelerometer having a particle suspended by a suspension system initially in a null position when the sum of the forces on the accelerometer equals zero, the accelerometer comprising means projecting light beams for defining opposed boundaries of the null position between the opposed plates, means for detecting occlusion of the light beams by the particle when the particle moves from the null position into the paths of the light beams, and means responsive to the detecting means for varying the suspension system to return the particle to the null position.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a schematic diagram of an embodiment of a quadrant detector position indicator;

FIG. 4 is a schematic diagram of an embodiment of a sound measurement position indicator;

FIG. 5 is a schematic diagram of an embodiment of a T.V. pixel position indicator.

DESCRIPTION OF THE PREFERRED EMBODIMENTS

Reference will now be made in detail to the present preferred embodiments of the invention as illustrated in the accompanying drawings.

Figure 1:
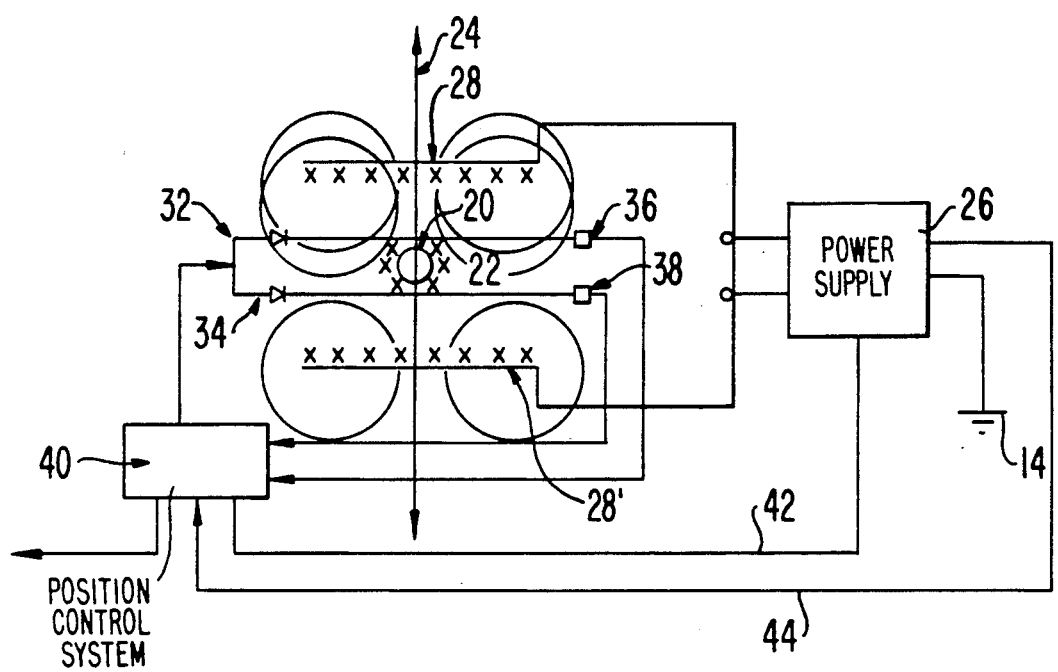
FIG. 1 is a schematic diagram of a single axis accelerometer incorporating the teachings of the present invention.
Figure 6:
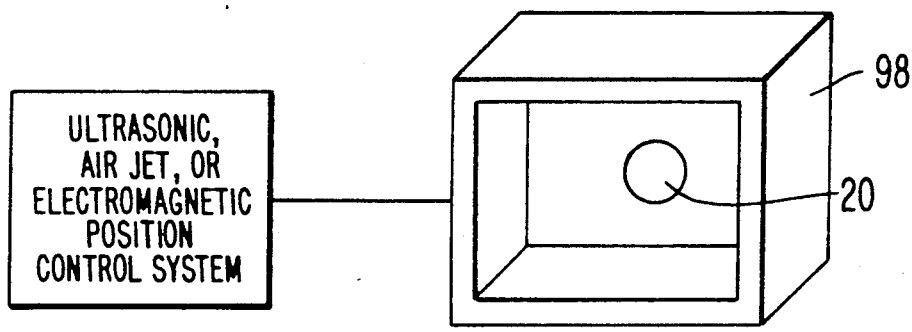
FIG. 6 depicts the suspension systems incorporated in the present invention.

In accordance with the present invention, there is provided an accelerometer having a particle suspended by a suspension system initially in a null position when the sum of the forces on the accelerometer equals zero. As embodied herein and as depicted in FIG. 1, charged particle 20 is suspended in an electrostatic field 22 along sensitive axis 24. Power for electrostatic field 22 is provided by power supply 26 that provides individual potential differences to upper plate 28 and lower plate 28' respectively disposed in parallel planes above and below particle 20. In the three-axis accelerometer depicted in FIG. 2, particle 20 is suspended in the null position at the intersection of x, y, and z axes between three sets of field plates 28, 30, and 31. Each set of field plates 28, 30, 31 corresponds to one of the three axes, and each set is perpendicular to its respective axis. Particle 20 can also be suspended by air jet, ultrasonic, or electromagnetic suspension systems, each being represented by reference numeral 98 in FIG. 6.

In accordance with the present invention, there is also provided means projecting light beams defining opposed boundaries of said null position between said opposed plates. As embodied herein and as depicted in FIG. 1, means projecting light beams include light emitting diodes 32 and 34. LED 32 is focused for emitting a first light beam substantially parallel to the surfaces of plates 28, 28' and substantially orthogonal to sensitive axis 24. LED source 34 is disposed for emitting a second light beam that is parallel to and spaced from the first light beam and is also orthogonal to sensitive axis 24. The space between the light beams is substantially equal to the width of particle 20. In the null position, particle 20 is suspended between the first and second light beams on sensitive axis 24. Thus, LED's 32 and 34 define opposed boundaries of the null position. Likewise, in the three-axis accelerometer shown in FIG. 2, three sets of LED's are disposed to emit light beams on either side of particle 20 along all three axes. Thus, the light beams define opposed boundaries of the null position along three axes.

Also in accordance with the present invention, there is provided means for detecting occlusion of said light beams by said particle when said particle moves from said null position into the paths of said light beams. As embodied herein, and as depicted in FIG. 1, detector means includes first light detector 36 and second light detector 38. LED's 32, 34 are focused on first and second light detectors 36, 38, respectively. Thus, if particle 20 moves into the path of either light beam, the occlusion of light will be detected by the respective detector.

Figure 2:
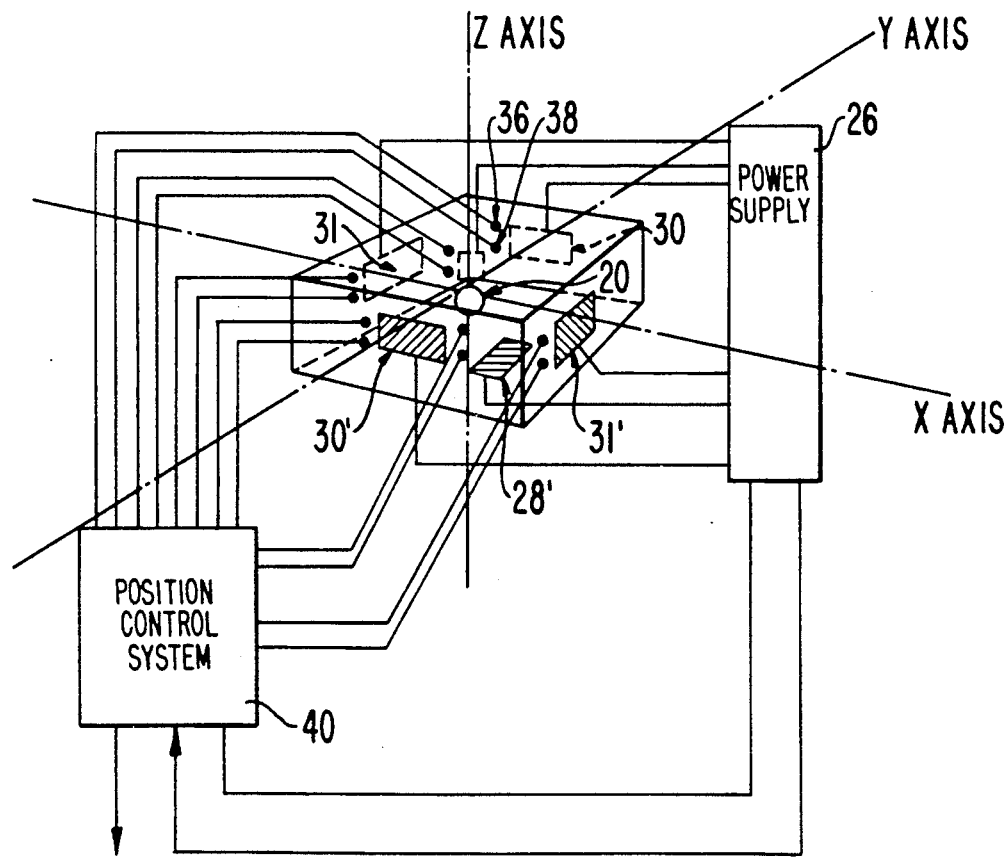
FIG. 2 is a schematic diagram of a three-axis accelerometer incorporating the teachings of the present invention.

Similarly, in the three-axis accelerometer depicted in FIG. 2, three sets of light detectors are disposed in the paths of the three sets of light beams. Therefore, movement of the particle along either of the three axis will occlude the light of a light beam, and will be detected by the respective detector.

In accordance with the invention, there is provided means responsive to said detecting means for varying the suspension system to return said particle to the null position. As embodied herein, and as depicted in FIG. 1, the particle is suspended electrostatically and the varying means includes position control system 40 that is electrically connected to detectors 36, 38 and to power supply 26. Position control system 40 monitors the outputs of detectors 36, 38 and upon sensing occlusion of light, sends a signal to power supply 26 through position feedback loop 42. Upon receiving a signal from the position control system 40, power supply 26 is varied to either increase or decrease the strength of the electrostatic field above one or more plates and thereby return particle 20 to the null position. The change in field strength is monitored by position control system 40 through power system feedback loop 44. When position control system 40 receives signals from detectors 36, 38 indicating that particle 20 has returned to the null position, the power information received from the power system feedback loop 44 is used to calculate the size of the force that caused the particle displacement.

The three-axis accelerometer depicted in FIG. 2 operates in a manner similar to the single axis accelerometer described above in connection with FIG. 1. The only difference between them is that the three-axis accelerometer triplicates the basic elements depicted in FIG. 1. Similarly, a two-axis accelerometer can be constructed by duplicating the basic elements depicted in FIG. 1.

Another type of position detection system that may be used with an electrostatic accelerometer is a quadrant position detection indicator such as the one depicted in FIG. 3. In this device, quadrant detector 50 is employed. LED 52 or other light source is focused onto particle 20 when it is in the null position. An optical intensity filter 54 may be used to absorb scattered reflections to sharpen the reflected spot. In the event of new forces acting on the system, the position of particle 20 is changed relative to the structurally fixed LED 52 and quadrant detector 50. The output of the detector is amplified by pre-amp 56 and the position of the reflected spot on the detector 50 is determined by position detection system 40. This position is used by position controller 58 to provide commands to the electrostatic field power supply 26. Power supply 26 is connected to field plates (not shown) via connectors 60. This allows the electrostatic field of each plate to be varied so that particle 20 may be brought back to the null position.

The voltage change required to return particle 20 to the null position is a function of the forces acting on the system, allowing the forces to be determined by position controller 58 and transmitted to a flight control system through output line 62. This quadrant system can be placed along the three orthogonal axes to provide an accelerometer sensitive along three orthogonal axes.

Another position detection system that may be employed is the reflected sound position detection system depicted in FIG. 4. In FIG. 4, a pulsed ultrasonic transmitter 70 is used to transmit a signal which is reflected from particle 20 and received by ultrasonic receiver 72. A comparison with the original or null position is made of the pulsed signal travel time and the newly determined distance to the particle in comparison circuit 74. From the distance measurement, the position of particle 20 relative to the plates is determined in position determination circuit 76. This position data is used as previously described. It is easy to see that the ultrasonic position-measuring-system can be replaced by an optical distance-measuring-system or a millimeter wave position-measuring-system to meet specific environmental or operational requirements. Use of this method may require that each axis transponder use a different frequency to reduce system noise and ambiguities.

A T.V. pixel position detection system employing a standard vidicon together with an image comparison system may also be used to determine the position of the particle. As shown in FIG. 5, vidicon 80 or a camera or similar device is focused on particle 20 through lens 84. The camera image is processed by camera electronics 82 and the current image location 86 relative to the array pixel matrix is stored in first memory circuit 90. This image is compared to the previous image or the null image 88 stored in second memory circuit 92, and the change in the image position in the two frames is established by comparison circuit 94. This comparison provides a measure of the change in particle position caused by changes in forces acting on the system. This data is used by position controller 58 to return the particle 20 to its null position as earlier described. The data is recomputed at the refresh rate of the camera system.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. An accelerometer, comprising:
   three mutually orthogonal sets of opposed field plates each set corresponding to a respective x, y and z axis extending therebetween;
   a charged particle electrostatically suspended between each set of opposed field plates, the particle initially in a null position at an intersection of said x, y, and z axes when the sum of the forces on the accelerometer equals zero;
   a first pair of light emitting diodes for projecting light beams on opposite sides of the particle along the x-axis to define first opposed boundaries of said null position between said opposed plates;
   a second pair of light emitting diodes for projecting light beams on opposite sides of the particle along the y-axis to define second opposed boundaries of said null position;

a third pair of light emitting diodes for projecting light beams on opposite sides of the particle along the z-axis to define third opposed boundaries of said null position;

means for detecting variation in light intensity of said light beams when said particle moves from the null position into the paths of said light beams; and means responsive to said detecting means for varying the electrostatic field generated by said opposed plates to return said particle to the null position.

2. An accelerometer as set forth in claim 1, wherein said light emitting diodes project light beams parallel to said opposed plates.

3. An accelerometer as set forth in claim 2, wherein the detecting means comprises a light detector disposed in opposition to each said diode for receiving the light beam therefrom.

4. An accelerometer as set forth in claim 1, wherein said varying means includes a position control system connected to said detecting means and controlling a variable power source for producing variable field strength in response to detected movement of said particle.

5. An accelerometer as set forth in claim 1, wherein said null position is defined by the intersection of three orthogonal sensitive axes, and wherein said accelerometer includes three pairs of opposed field plates, each pair corresponding to a respective one of said three sensitive axes.

6. An accelerometer, comprising:

a suspension system for suspending a particle with respect to three mutually orthogonal axes x, y and z;

a particle suspended by said suspension system at a null position at the intersection of the x, y and z axes when the sum of the forces on the accelerometer equals zero;

three pair of light emitting diodes, each pair for projecting light beams on opposite sides of the particle along said x, y, and z axes to define three sets of opposed boundaries of said null position;

means for detecting variation in light intensity of said light beams when said particle moves from the null position into the paths of said light beams; and means responsive to said detecting means for varying the suspension system to return said particle to the null position.

7. An accelerometer as set forth in claim 6, wherein the suspension system comprises opposed field plates disposed on either side of said particle for generating an electrostatic field.

8. An accelerometer as set forth in claim 6, wherein said suspension system is ultrasonic.

9. An accelerometer as set forth in claim 6, wherein said suspension system includes air jets.

10. An accelerometer as set forth in claim 6, wherein said suspension system includes electromagnets.

11. An accelerometer as set forth in claim 6, wherein the detecting means comprises a light detector disposed in opposition to each said diode for receiving the light beam therefrom.

12. An accelerometer as set forth in claim 6, wherein said varying means includes a position control system connected to said detecting means and controlling the suspension system in response to detected movement of said particle.

* * * * *

UNITED STATES PATENT AND TRADEMARK OFFICE
CERTIFICATE OF CORRECTION

PATENT NO. : 5,050,435

DATED : September 24, 1991

INVENTOR(S) : George T. Pinson

It is certified that error appears in the above-identified patent and that said Letters Patent is hereby corrected as shown below:

ON THE TITLE PAGE

IN THE ABSTRACT:

Line 3, change "acelerometer" to --accelerometer--; and

Line 2, after "plates" insert --initially--.

Signed and Sealed this

Seventeenth Day of March, 1992

Attest:

HARRY F. MANBECK, JR.

Attesting Officer

Commissioner of Patents and Trademarks